(12) United States Patent
Kim et al.

(10) Patent No.: US 10,048,545 B2
(45) Date of Patent: Aug. 14, 2018

(54) LIQUID CRYSTAL DISPLAY STRUCTURE IMPROVING AFTERIMAGE DISPERSION

(71) Applicant: Samsung Display Co. Ltd., Yongin-si (KR)

(72) Inventors: Kang Woo Kim, Seoul (KR); Jong Hwan Lee, Asan-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/180,195

(22) Filed: Jun. 13, 2016

(65) Prior Publication Data

US 2017/0123279 A1 May 4, 2017

(30) Foreign Application Priority Data

Nov. 3, 2015 (KR) .................. 10-2015-0153911

(51) Int. Cl.

| | | |
|---|---|---|
| *G02F 1/136* | (2006.01) | |
| *G02F 1/1343* | (2006.01) | |
| *G02F 1/1362* | (2006.01) | |
| *G02F 1/1368* | (2006.01) | |
| G02F 1/1335 | (2006.01) | |
| G02F 1/1333 | (2006.01) | |

(52) U.S. Cl.
CPC ...... *G02F 1/134309* (2013.01); *G02F 1/1368* (2013.01); *G02F 1/13439* (2013.01); *G02F 1/133514* (2013.01); *G02F 1/136286* (2013.01); *G02F 1/133512* (2013.01); *G02F 2001/133397* (2013.01); *G02F 2001/133519* (2013.01); *G02F 2201/121* (2013.01); *G02F 2201/123* (2013.01)

(58) Field of Classification Search
CPC ............ G02F 1/134309; G02F 1/1368; G02F 1/136286; G02F 1/13439; G02F 1/133514; G02F 1/133512; G02F 2201/121; G02F 2001/133519; G02F 2001/133397; G02F 2201/123
See application file for complete search history.

(56) References Cited

U.S. PATENT DOCUMENTS

| | | |
|---|---|---|
| 4,660,030 A | 4/1987 | Maezawa |
| 8,754,999 B2 * | 6/2014 | Lee ................. G02F 1/136259 349/139 |
| 2006/0012551 A1 | 1/2006 | Chiu et al. |
| 2006/0012552 A1 | 1/2006 | Chiu et al. |
| 2012/0133855 A1 * | 5/2012 | Whangbo ............ G02F 1/1343 349/41 |
| 2016/0216571 A1 * | 7/2016 | Kim ................. G02F 1/136286 |

* cited by examiner

*Primary Examiner* — Tracie Y Green
(74) *Attorney, Agent, or Firm* — Cantor Colburn LLP

(57) ABSTRACT

A liquid crystal display includes a first substrate and a second substrate facing each other, a liquid crystal layer disposed between the first substrate and the second substrate, a gate line and a data line disposed on the first substrate to intersect with each other, the gate line and data line defining a pixel region, a sustain electrode disposed on the first substrate and overlapping the data line, and a pixel electrode disposed in the pixel region on the first substrate, the pixel electrode including an edge portion overlapping the sustain electrode, an open portion defined in an inner side of the edge portion and overlapping a boundary of the sustain electrode, and a central portion disposed at an inner side of the open portion.

20 Claims, 9 Drawing Sheets

LIQUID CRYSTAL DISPLAY STRUCTURE IMPROVING AFTERIMAGE DISPERSION

This application claims priority to Korean Patent Application No. 10-2015-0153911, filed on Nov. 3, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display.

2. Description of the Related Art

As one of the most widely used flat panel displays at present, a liquid crystal display ("LCD") includes two display panels on which electrodes are formed, and a liquid crystal layer interposed between the two display panels. The LCD is a display device which is operated in such a way that the quantity of light transmitted through the liquid crystal layer is adjusted by applying voltage to the electrodes and liquid crystal molecules included in the liquid crystal layer are rearranged.

The LCD includes a color filter so as to display an image with various colors and uses a thin film transistor ("TFT") as a switching element for independently operating each pixel. Such a TFT is connected with a pixel electrode, a gate line through which a scanning signal is transmitted, and a data line through which an image signal is transmitted. A scanning signal and a data signal are transmitted through the gate line, the data line, etc. Depending on the scanning signal, the TFT controls the data signal that is transmitted to the pixel electrode.

A part of a pixel electrode may overlap a sustain electrode so as to maintain voltage applied to the pixel electrode. In the case where the pixel electrode has a planar shape, for example, an edge portion of the pixel electrode may overlap the sustain electrode. In this case, a portion on which the pixel electrode and the sustain electrode overlap each other forms a stepped structure.

SUMMARY

In a structure in which the pixel electrode overlaps the sustain electrode, a surface of the pixel electrode may not be flat. The stepped structure provided on the pixel electrode may cause a difference between electric fields of positive and negative poles generated between the pixel electrode and a common electrode. Thereby, afterimage dispersion may deteriorate.

Exemplary embodiments of the invention provide a liquid crystal display ("LCD") which has a structure improving afterimage dispersion.

However, exemplary embodiments of the invention are not restricted to the one set forth herein. The above and other exemplary embodiments of the invention will become more apparent to one of ordinary skill in the art to which the invention pertains by referencing the detailed description of the invention given below.

In one exemplary embodiment of the invention, there is provided an LCD, including a first substrate and a second substrate facing each other, a liquid crystal layer disposed between the first substrate and the second substrate, a gate line and a data line disposed on the first substrate to intersect with each other, the gate line and data line defining a pixel region, a sustain electrode disposed on the first substrate and overlapping the data line, and a pixel electrode disposed in the pixel region on the first substrate, the pixel electrode including an edge portion overlapping the sustain electrode, an open portion defined in an inner side of the edge portion and overlapping a boundary of the sustain electrode, and a central portion disposed at an inner side of the open portion.

In an exemplary embodiment, the data line and the open portion may extend in a first direction.

In an exemplary embodiment, the open portion may include a first end and a second end with respect to the first direction, and the boundary of the sustain electrode traverses the first and second ends of the open portion.

In an exemplary embodiment, the pixel electrode may include a first connection portion disposed on a first side of the first end of the open portion, and a second connection portion disposed on a second side of the second end of the open portion, and each of the first and second connection portions may include a first end and a second end with respect to a second direction perpendicular to the first direction, the first end of each of the first and second connection portions may be coupled to the central portion, and the second end of each of the first and second connection portions may be coupled to the edge portion.

In an exemplary embodiment, a surface of the central portion may be flat.

At least a part of the first and second connection portions may overlap the sustain electrode.

In an exemplary embodiment, the open portion may include a first open portion and a second open portion, and the first open portion and the second open portion are spaced apart from each other in the first direction.

In an exemplary embodiment, the edge portion may include a first edge portion and a second edge portion that extend in the first direction, and the first edge portion and the second edge portion may be spaced apart from each other in the first direction.

In an exemplary embodiment, the open portion may have a rectangular shape in a plan view.

In an exemplary embodiment, a width of the open portion with respect to the second direction perpendicular to the first direction may be about 3 micrometers (μm) to about 5 μm.

In an exemplary embodiment, the LCD may further include a light blocking pattern disposed on the second substrate and overlapping the data line, a width of the light blocking pattern with respect to the second direction perpendicular to the first direction may be greater than a width of the sustain electrode with respect to the second direction.

In an exemplary embodiment, the LCD may further include an overcoating layer disposed on the light blocking pattern, and a common electrode disposed on the overcoating layer.

In another exemplary embodiment of the invention, there is provided an LCD including a first substrate and a second substrate facing each other, a liquid crystal layer disposed between the first substrate and the second substrate, first and second gate lines disposed on the first substrate and spaced apart from each other in a first direction, first and second data lines disposed on the first substrate to respectively intersect the first and second gate lines, the first and second data lines being spaced apart from each other in a second direction perpendicular to the first direction, a first sustain electrode and a second sustain electrode disposed on the first substrate, the first sustain electrode overlapping the first data line, the second electrode overlapping the second data line, and a pixel electrode including a first edge portion overlapping the first sustain electrode, a second edge portion overlapping the second sustain electrode, a first open portion defined in an inner side of the first edge portion and overlapping a boundary of the first sustain electrode, a second open portion defined in an inner side of the second edge portion and overlapping a boundary of the second sustain electrode, and a central portion disposed at an inner side of the first open portion and the second open portion.

In an exemplary embodiment, the first and second data lines and the first and second open portions may extend in the first direction.

In an exemplary embodiment, each of the first and second open portions may include a first end and a second end with respect to the first direction, the boundary of the first sustain electrode may traverse the first and second ends of the first open portion, and the boundary of the second sustain electrode may traverse the first and second ends of the second open portion.

In an exemplary embodiment, the pixel electrode may include a 1st-1 connection portion disposed on a first side of a first end of the first open portion, a 2nd-1 connection portion disposed at a second side of a second end of the first open portion, a 1st-2 connection portion disposed at a first side of a first end of the second open portion, and a 2nd-2 connection portion disposed at a second side of a second end of the second open portion, and where each of the 1st-1, 2nd-1, 1st-2, and 2nd-2 connection portions may include a first end and a second end with respect to a second direction perpendicular to the first direction, the first end of each of the 1st-1 and 2nd-1 connection portions and the second end of each of the 1st-2 and 2nd-2 connection portions may be coupled to the central portion, the second end of each of the 1st-1 and 2nd-1 connection portions may be coupled to the first edge portion, and the first end of each of the 1st-2 and 2nd-2 connection portions may be coupled to the second edge portion.

In an exemplary embodiment, the first open portion may include a 1st-1 open portion and a 1st-2 open portion, and the second open portion may include a 2nd-1 open portion and a 2nd-2 open portion, and the 1st-1 open portion and the 1st-2 open portion may be spaced apart from each other in the first direction, and the 2nd-1 open portion and the 2nd-2 open portion may be spaced apart from each other in the first direction.

In an exemplary embodiment, the first edge portion may include a 1st-1 edge portion and 1st-2 edge portion that extend in the first direction, and the second edge portion may include a 2nd-1 edge portion and 2nd-2 edge portion that extend in the first direction, and the 1st-1 edge portion and the 1st-2 edge portion may be spaced apart from each other in the first direction, and the 2nd-1 edge portion and the 2nd-2 edge portion may be spaced apart from each other in the first direction.

In an exemplary embodiment, the first sustain electrode and the second sustain electrode may extend in the first direction, the LCD may further include a third sustain electrode extending in the second direction perpendicular to the first direction, and a first end of the third sustain electrode with respect to the second direction may be coupled to the first sustain electrode, and a second end of the third sustain electrode with respect to the second direction may be coupled to the second sustain electrode, and the pixel electrode may include a third edge portion overlapping the third sustain electrode, and the third open portion defined in an inner side of the third edge portion and overlapping a boundary of the third sustain electrode.

In an exemplary embodiment, the third open portion may extend in the second direction, the third open portion may include a first end and a second end with respect to the second direction, the first end of the third open portion may be coupled to the first open portion, and the second end of the third open portion may be coupled to the second open portion.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
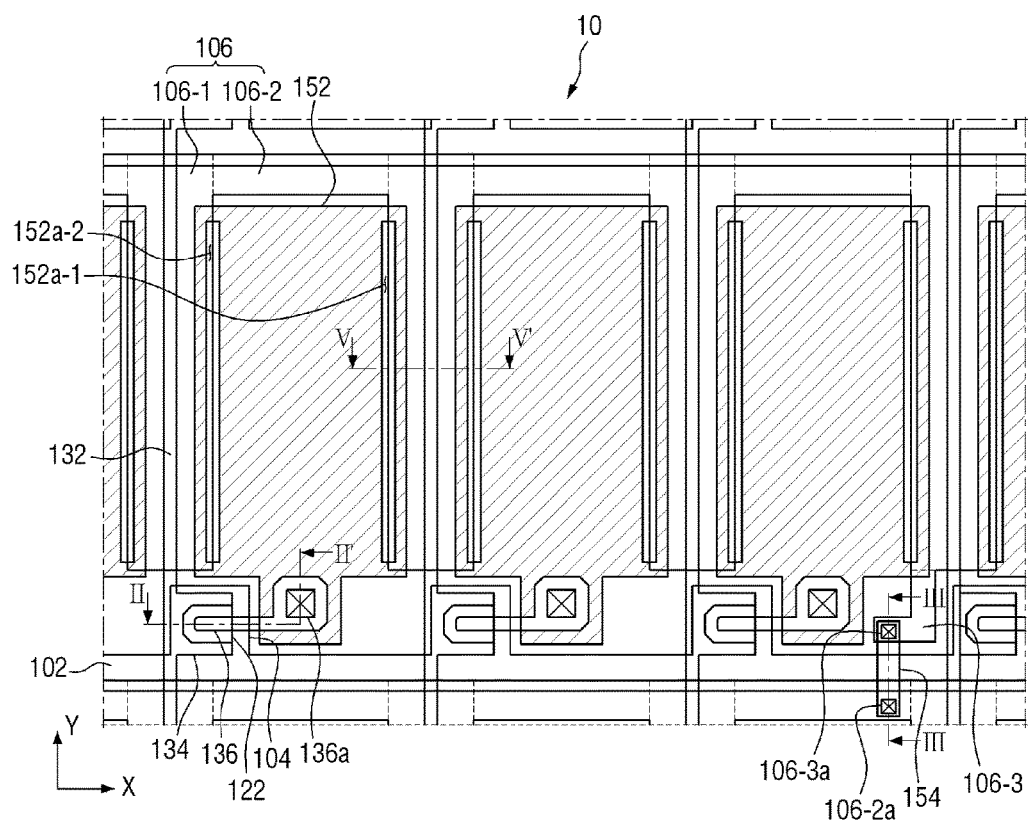
FIG. 1 is a plan view of an LCD according to an embodiment of the invention.

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this invention will be thorough and complete and will fully convey the concept of the invention to those skilled in the art, and the invention will only be defined by the appended claims.

It will also be understood that when a layer is referred to as being "on" another layer or substrate, it can be directly on the other layer or substrate, or intervening layers may also be present. The same reference numbers indicate the same components throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described with reference to the attached drawings.

Figure 2:
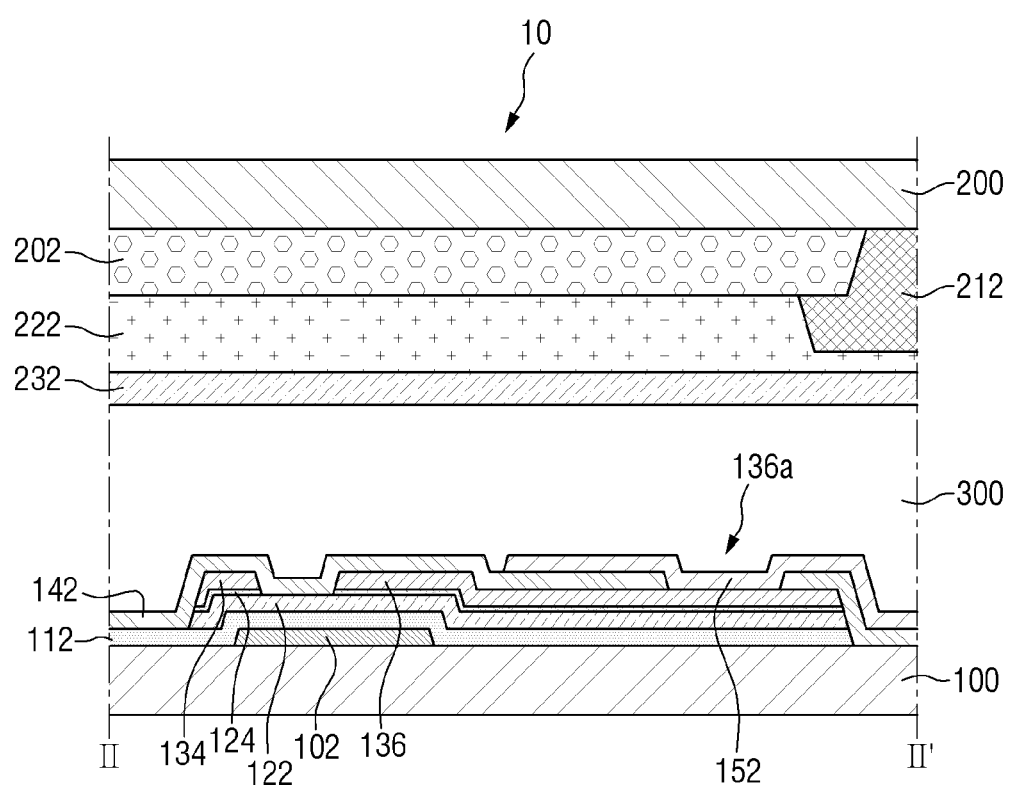
FIG. 2 is a sectional view taken along line II-IF of FIG. 1.
Figure 3:
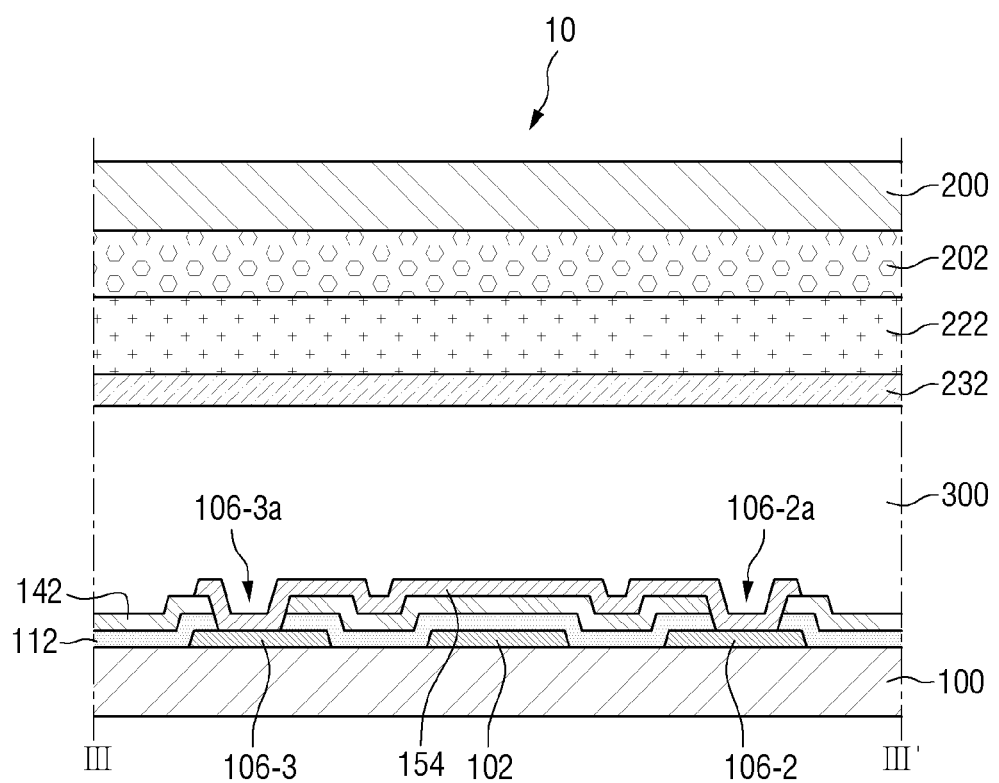
FIG. 3 is a sectional view taken along line of FIG. 1.

FIG. 1 is a plan view of a liquid crystal display ("LCD") according to an embodiment of the invention. FIG. 2 is a sectional view taken along line II-II' of FIG. 1. FIG. 3 is a sectional view taken along line of FIG. 1.

Referring to FIGS. 1 to 3, the LCD 10 according to the exemplary embodiment of the invention includes a first substrate 100 and a second substrate 200 which face each other, and a liquid crystal layer 300 which is interposed between the first substrate 100 and the second substrate 200.

In an exemplary embodiment, the first substrate 100 and the second substrate 200 may include insulation material such as transparent glass, quartz, ceramic, silicon, or transparent plastic, which may be appropriately selected as needed by those skilled in the art. The first substrate 100 and the second substrate 200 may face each other.

In exemplary embodiments, the first substrate 100 and the second substrate 200 may have flexibility. That is, the first substrate 100 and the second substrate 200 may be substrates which may be changed in shape by rolling, folding, bending or the like.

A plurality of gate wires 102 and 104 and a plurality of data wires 132, 134, and 136 may be disposed on the first substrate 100.

The gate wires 102 and 104 include a plurality of gate lines 102 and a plurality of gate electrodes 104. The data wires 132, 134, and 136 may include a plurality of data lines 132, a plurality of source electrodes 134, and a plurality of drain electrodes 136.

In an exemplary embodiment, the gate wires 102 and 104 and the data wires 132, 134, and 136 may include aluminum-based metal such as aluminum (Al) or an aluminum alloy, silver-based metal such as silver (Ag) or a silver alloy, copper-based metal such as copper (Cu) or a copper alloy, molybdenum-based metal such as molybdenum (Mo) or a molybdenum alloy, chrome (Cr), titanium (Ti), tantalum (Ta), or the like. Furthermore, the gate wires 102 and 104 and the data wires 132, 134, and 136 each may have a multi-film structure including two conductive films (not shown) having different physical properties. In an exemplary embodiment, one conductive film may include aluminum-based metal, silver-based metal, copper-based metal, or the like, and the other conductive film may include molybdenum-based metal, chrome, titanium, tantalum, or the like, for example. Examples of such combination may include a combination of a lower chrome film and an upper aluminum film, and a combination of a lower aluminum film and an upper molybdenum film. However, the invention is not limited thereto. The gate wires 102 and 104 and the data wires 132, 134, and 136 may include various other metals and conductors.

Each gate line 102 may extend in a first direction (X-axis direction), for example, along a boundary of a pixel in a row direction. Each data line 132 may extend in a second direction (Y-axis direction), for example, along a boundary of a pixel in a column direction. The gate lines 102 and the data lines 132 are arranged to intersect with each other, thus defining a plurality of pixel areas. In other words, the pixel areas may be defined as regions enclosed by the gate lines 102 and the data lines 132. Although not shown in the drawings, in exemplary embodiments, the data lines 132 may be periodically bent so as to enhance transmittance. However, the invention is not limited thereto.

Gate electrodes 104 are arranged on each gate line 102 such that at least one gate electrode 104 is coupled to each pixel. The gate electrode 104 may be provided in such a way that it protrudes from the gate line 102 toward a semiconductor layer 122 or may be provided by expanding the gate line 102. However, the invention is not limited thereto. The gate electrode 104 may be defined on an extension path of the gate line 102 in an area in which the gate line 102 overlaps the semiconductor layer 122.

Source electrodes 134 are arranged on each data line 132 such that at least one source electrode 134 is coupled to each pixel. The source electrode 134 may be provided in such a way that it protrudes from the data line 132 toward the semiconductor layer 122 or may be provided by expanding the data line 132. However, the invention is not limited thereto. The source electrode 134 may be defined on an extension path of the data line 132 in an area in which the data line 132 overlaps the semiconductor layer 122. In an exemplary embodiment, the source electrode 134 may be disposed substantially on the same line as the data line 132 rather than protruding from the data line 132, for example. Each drain electrode 136 may be spaced apart from the corresponding source electrode 134 based on the semiconductor layer 122. The drain electrode 136 may be electrically connected to the corresponding pixel electrode 152 through a contact hole 136a which is defined to pass through a passivation layer 142.

A gate insulation film 112 may be disposed between the gate wires 102 and 104 and the data wires 132, 134, and 136. In an embodiment, the gate insulation film 112 may be disposed on the gate wires 102 and 104, and the data wires 132, 134, and 136 may be disposed on the gate insulation film 112. In an exemplary embodiment, the gate insulation film 112 may include nitride silicon (SiNx), silicon oxynitride (SiON), or a laminated film including these, etc., for example. The gate insulation film 112 may maintain insulation between the gate wires 102 and 104 and conductive thin films such as the data lines 132 disposed on the gate wires 102 and 104.

In an exemplary embodiment, the semiconductor layer 122 is disposed on the gate insulation film 112 and, for example, may include hydrogenated amorphous silicon, polycrystalline silicon or the like, for example. The semiconductor layer 122 is disposed such that at least a portion thereof overlaps the gate electrodes 104. The semiconductor layer 122 along with the gate electrode 104, the source electrode 134, and the drain electrode 136 provides a thin film transistor ("TFT").

The semiconductor layer 122 may have various shapes, e.g., a linear shape, an island shape, etc. Although, in FIG. 2, the semiconductor layer 122 is illustrated as having a linear shape, the invention is not limited thereto. In the case where the semiconductor layer 122 has a linear shape, it may overlap data wires 132, 134, and 136.

An ohmic contact layer 124, which includes n+ hydrogenated amorphous silicon or the like doped with high concentration n-type impurities, may be disposed on the semiconductor layer 122. The ohmic contact layer 124 is disposed between the semiconductor layer 122 disposed therebelow and the source electrode 134 and the drain electrode 136 which are disposed thereon, and reduces contact resistance. Similar to the semiconductor layer 122, the ohmic contact layer 124 may have various shapes, e.g., an island shape, a linear shape, etc. In the case where the semiconductor layer 122 has a linear shape, the ohmic contact layer 124 may also have a linear shape. In the case where the semiconductor layer 122 has an island shape, the ohmic contact layer 124 may also have an island shape. Unlike the semiconductor layer 122, the ohmic contact layer 124 is open on portion thereof corresponding to a space by which the source electrode 134 and the drain electrode 136 facing each other are spaced apart from each other. Thus, the semiconductor layer 122 disposed below the ohmic contact layer 124 may be exposed. A channel may be defined on the semiconductor layer 122 in a region defined between the source electrode 134 and the drain electrode 136 that face each other and are spaced apart from each other.

When a gate ON signal is applied to the gate electrode 104 and thus a channel is defined in the semiconductor layer 122, the TFT is turned on, the drain electrode 136 may receive a data signal from the source electrode 134 and transmit it to the pixel electrode 152.

The passivation layer 142 is disposed on the data wires 132, 134, 136 and the exposed portion of the semiconductor layer 122. The passivation layer 142 may have the contact hole 136a through which at least a part of the drain electrode 136 is exposed. The portion of the drain electrode 136 that is exposed through the contact hole 136a may come into contact with the pixel electrode 152. Thereby, the drain electrode 136 and the pixel electrode 152 may be electrically connected/coupled to each other.

In an exemplary embodiment, the passivation layer 142 may include inorganic material such as nitride silicone or silicon oxide, material such as a-Si:C:O, a-Si:O:F provided by plasma enhanced chemical vapor deposition ("PECVD"), and so forth, for example.

The pixel electrode 152 may be disposed for each unit pixel on the passivation layer 142. A part of the pixel electrode 152 is disposed in the contact hole 136a. The portion of the pixel electrode 152 that is disposed in the contact hole 136a may come into contact with the drain electrode 136 and be electrically connected thereto.

When a data voltage is applied to the pixel electrode 152 through the contact hole 136a, the pixel electrode 152 along with a common electrode 232 forms an electric field and thus is able to rotate liquid crystal molecules included in the liquid crystal layer 300. The pixel electrode 152 may include transparent conductive material such as indium tin oxide ("ITO"), indium zinc oxide ("IZO"), or the like. However, the invention is not limited thereto.

A detailed structure of the pixel electrode 152 will be described later herein.

Sustain electrodes 106 are disposed on the first substrate 100. A constant voltage may be applied to the sustain electrodes 106. In an exemplary embodiment, the same voltage as a voltage applied to the common voltage 232 may be applied to the sustain electrodes 106. However, the invention is not limited thereto.

In exemplary embodiments, each sustain electrode 106 may include, as shown in the exemplary embodiment of FIG. 1, a first extension 106-1 which extends substantially in the same direction (e.g., the column direction) as that of the data line 132, and a second extension 106-2 which extends substantially in the same direction (e.g., the row direction) as the gate line 102. The first extension 106-1 and the second extension 106-2 may be embodied to have a single body and electrically connected to each other. The first extension 106-1 and the second extension 106-2 may alternate with each other in the row direction of the pixels.

The sustain electrode 106 may overlap at least a part of the corresponding pixel electrode 152. In exemplary embodiments, as shown in the exemplary embodiment of FIG. 1, the first extension 106-1 may overlap an edge portion 152-3 of the corresponding pixel electrode 152. The first extension 106-1 may overlap the corresponding data line 132.

In exemplary embodiments, the sustain electrode 106 may be disposed on the same layer as that of the gate wires 102 and 104 and include the same material as that of the gate wires 102 and 104. However, this is only for illustrative purposes, and the disposition of the sustain electrode 106 is not limited to this.

In exemplary embodiments, the sustain electrodes 106 may also be electrically connected to each other in the column direction of the pixels. Referring to FIGS. 1 and 3, each sustain electrode 106 may include a third extension 106-3 which extends from the first extension 106-1. A bridge electrode 154 may be disposed both in a contact hole 106-3a through which at least a part of the third extension 106-3 is exposed and in a contact hole 106-2a through which at least a part of the second extension 106-2 is exposed. The bridge electrode 154 may be embodied in such a way that it is disposed in the contact hole 106-3a and the contact hole 106-2a and is brought into contact with the third extension 106-3 and the second extension 106-2. In exemplary embodiments, the bridge electrode 154 may be disposed on the same layer as that of the pixel electrodes 152. However, this is only for illustrative purposes, and the structure of the bridge electrode 154 is not limited to this. In exemplary embodiments, one bridge electrode 154 may be disposed per three pixels which are successively arranged in the row direction. However, the invention is not limited thereto.

A light blocking pattern 202, a color filter 212, an overcoating layer 222, and a common electrode 232 may be disposed on the second substrate 200.

The light blocking pattern 202 may be disposed on the second substrate 200. The light blocking pattern 202 prevents light from leaking out. The light blocking pattern 202 may be disposed on a TFT region and a non-pixel region (between pixels and pixels, and on gate line regions and data line regions). The light blocking pattern 202 is provided along the boundaries of the pixels and allows the pixel regions to be exposed to the outside. In this case, the light blocking pattern 202 may have a lattice pattern.

The light blocking pattern 202 may include material capable of blocking the transmission of light. The light blocking effect may be embodied by reflecting or absorbing incident light. In an exemplary embodiment, the light blocking pattern 202 may include metal such as chrome having high reflexibility, thus providing the light blocking effect. In another exemplary embodiment, the light blocking pattern 202 may include an organic film (a black organic film) including material such as black dye or pigment so that most incident light may be absorbed, thus providing the light blocking effect. In exemplary embodiments, the light blocking pattern 202 may include a laminated film including a metal film and a black organic film.

The color filter 212 may include an organic film including dyes or pigments representing respective colors. The color filter 212 may occupy the pixel regions. In an exemplary embodiment, the color filter 212 may include a red color filter, a green color filter, and a blue color filter, for example. Each of the red color filter, the green color filter, and the blue color filter is disposed on a single pixel, thus forming a red, green or blue pixel. The color filter 212 may overlap the pixel electrode 152.

The color filter 212 may be disposed on the light blocking pattern 202. In detail, a part of the color filter 212 may extend to the light blocking pattern 202 that is disposed on the boundary of the pixel and thus partially overlap the light blocking pattern 202.

The overcoating layer 222 may be disposed on the color filter 212. The overcoating layer 222 may include a transparent organic film. The overcoating layer 222 that is disposed on the color filter 212 may flatten the red color filter, the green color filter, and the blue color filter that may be stepped.

The common electrode 232 may be disposed on the overcoating layer 222. The common electrode 232 may be applied with a common voltage and generate an electric field along with the pixel electrode 152, thus controlling the orientation of the liquid crystal molecules included in the liquid crystal layer 300.

The common electrode 232 may be provided into an integrated shape throughout the entirety of the pixel region enclosed by the gate lines 102 and the data lines 132. In an exemplary embodiment, the common electrode 232 may include transparent material such as ITO or IZO, but the invention is not limited thereto.

Alignment films may be respectively disposed on one surface of the first substrate 100 and one surface of the second substrate 200 that face the liquid crystal layer 300. In an exemplary embodiment, each alignment film may include a resinous polymer such as polyimide, polyamic acid, polyamide, polyamic imide, polyester, polyethylene, polyurethane, or polystyrene, or a combination thereof. Furthermore, the alignment film may be embodied to include the monomer of the resinous polymer.

Hereinafter, the detailed structure of the pixel electrode 152 will be described in detail.

Figure 4:
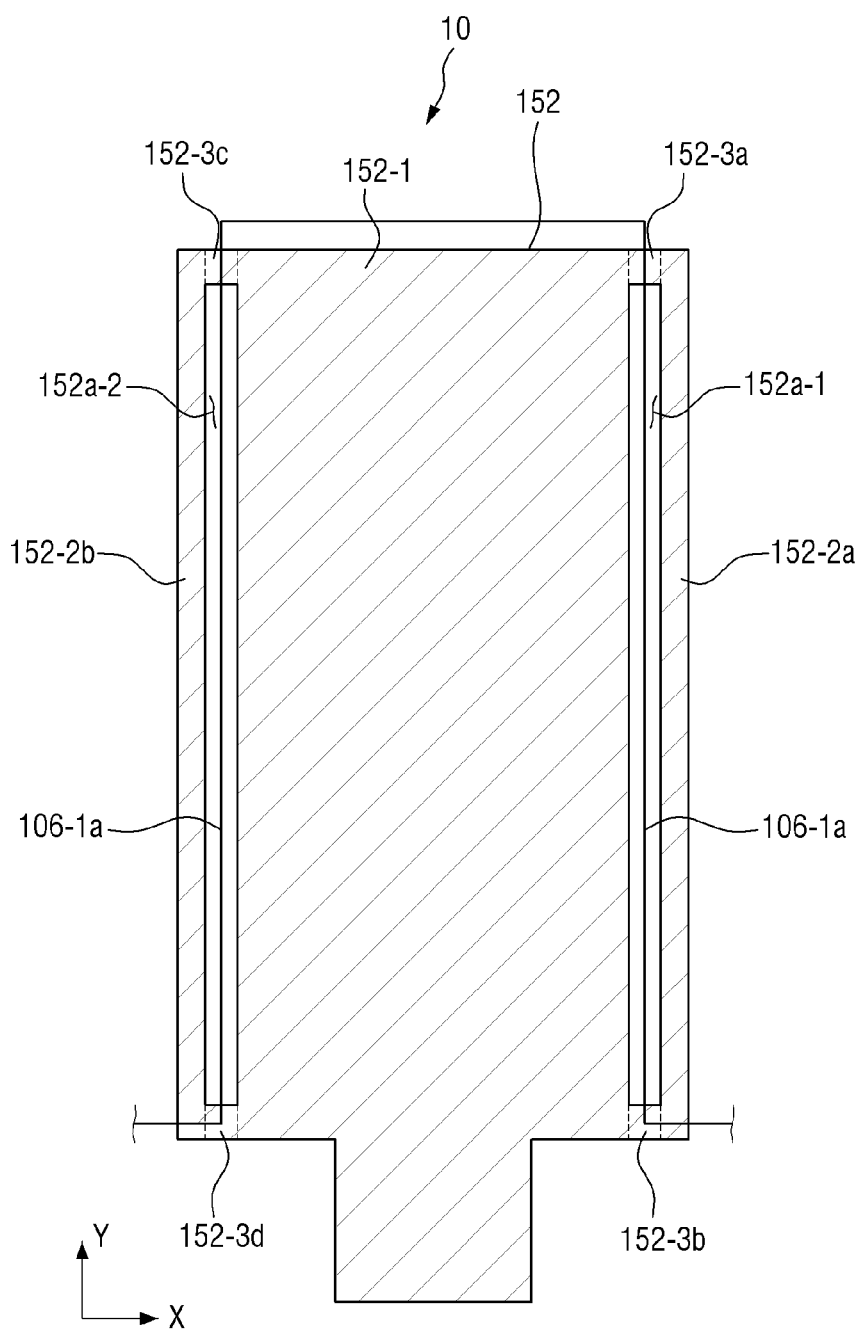
FIG. 4 is a plan view illustrating a pixel electrode of the LCD according to the exemplary embodiment of the invention.
Figure 5:
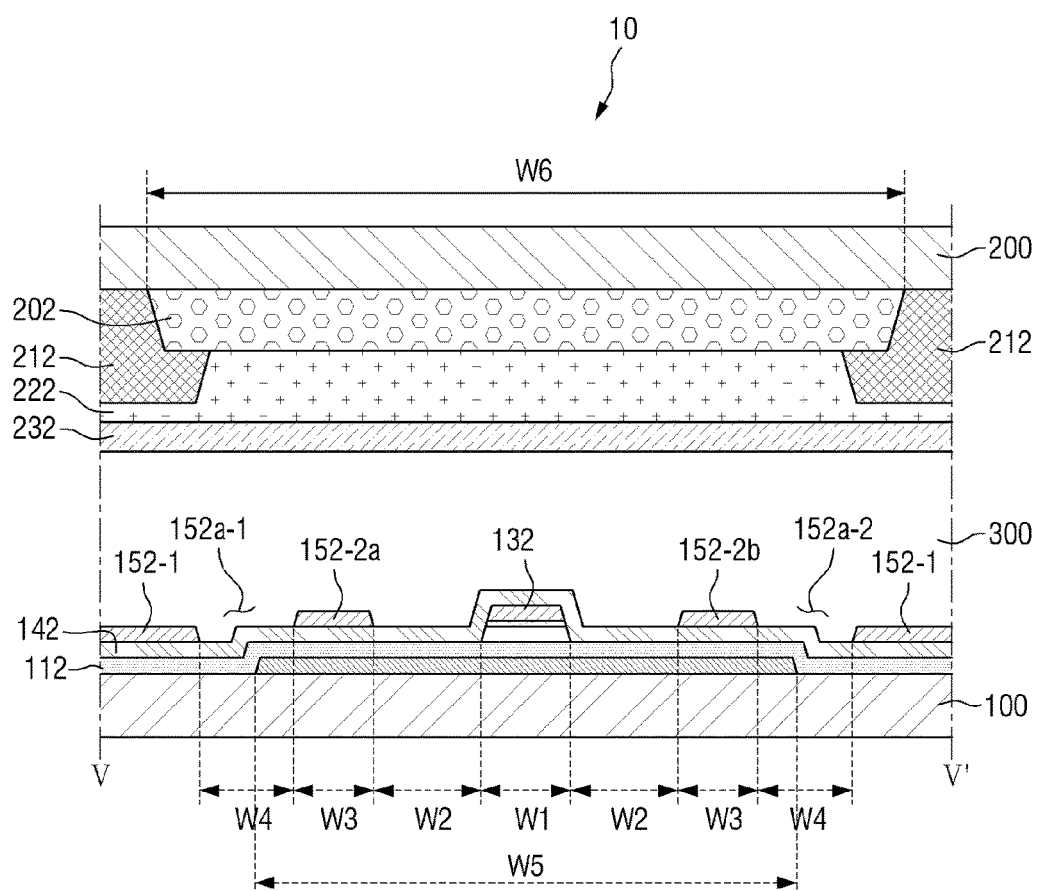
FIG. 5 is a sectional view taken along line V-V' of FIG. 1.

FIG. 4 is a plan view illustrating the pixel electrode of the LCD according to the exemplary embodiment of the invention. FIG. 5 is a sectional view taken along line V-V' of FIG. 1.

Referring to FIGS. 4 and 5, the pixel electrode 152 of the LCD 10 according to the exemplary embodiment of the invention includes a central portion 152-1, edge portions 152-2a and 152-2b, open portions 152a-1 and 152a-2, and connection portions 152-3a, 152-3b, 152-3c, and 152-3d.

The central portion 152-1 of the pixel electrode 152 may be disposed in each pixel region and be disposed at the center of the pixel region, that is, at an inner side of the edge portions 152-2a and 152-2b, the open portions 152a-1 and 152a-2, and the connection portions 152-3a, 152-3b, 152-3c, and 152-3d. The central portion 152-1 may have a planar shape, as shown in the exemplary embodiment of FIG. 4. The central portion 152-1 may not overlap the sustain electrode 106.

The edge portions 152-2a and 152-2b of the pixel electrode 152 may be disposed on the perimeter of the pixel region, that is, at an outer side of the central portion 152-1, the open portions 152a-1 and 152a-2, and the connection portions 152-3a, 152-3b, 152-3c, and 152-3d. The edge portions 152-2a and 152-2b may overlap at least a part of the sustain electrode 106 (refer to FIG. 1).

In exemplary embodiments, the edge portions 152-2a and 152-2b include a first edge portion 152-2a and a second edge portion 152-2b, as shown in the exemplary embodiment of FIG. 4. The first edge portion 152-2a and the second edge portion 152-2b may overlap the corresponding first extensions 106-1 (refer to FIG. 1) of the sustain electrodes 106. The first edge portion 152-2a and the second edge portion 152-2b may be disposed inside the first extensions 106-1 of the sustain electrode 106. The first edge portion 152-2a and the second edge portion 152-2b may completely overlap the first extensions 106-1.

Referring to FIG. 4, the first edge portion 152-2a may be disposed on a first side (a right side in the drawing) of the central portion 152-1. The second edge portion 152-2b may be disposed on a second side (a left side in the drawing) of the central portion 152-1 that is opposite to the first side.

The first edge portion 152-2a and the second edge portion 152-2b may have shapes extending in one direction. In an exemplary embodiment, as shown in the exemplary embodiment of FIG. 4, the first edge portion 152-2a and the second edge portion 152-2b may have shapes extending in the same direction of the direction (column direction) in which the data line 132 extends, for example.

In exemplary embodiments, each of the first and second edge portions 152-2a and 152-2b may have a rectangular shape in a plan view, as shown in the exemplary embodiment of FIG. 4. However, this is only for illustrative purposes, the shapes of the first and second edge portions 152-2a and 152-2b are not limited to this.

The open portions 152a-1 and 152a-2 of the pixel electrode 152 may be defined in an inner side of the edge portions 152-2a and 152-2b. That is, the open portions 152a-1 and 152a-2 are defined between the central portion 152-1 and the edge portions 152-2a and 152-2b.

Each open portion 152a-1, 152a-2 may partially overlap the corresponding sustain electrode 106. In other words, the open portion 152a-1, 152a-2 may have a portion which does not overlap the sustain electrode 106. That is, the open portion 152a-1, 152a-2 may overlap a boundary 106-1a of the sustain electrode 106.

In exemplary embodiments, the open portions 152a-1 and 152a-2 may include a first open portion 152a-1 and a second open portion 152a-2, as shown in the exemplary embodiment of FIG. 4. The first open portion 152a-1 is defined between the central portion 152-1 and the first edge portion 152-2a. The second open portion 152a-2 is defined between the central portion 152-1 and the second edge portion 152-2b.

Each of the first and second open portions 152a-1 and 152a-2 may only partially overlap the corresponding first extension 106-1 of the sustain electrode 106. That is, each of the first and second open portions 152a-1 and 152a-2 may have a portion which does not overlap the first extension 106-1 of the sustain electrode 106. In other words, each of the first and second open portions 152a-1 and 152a-2 may overlap the boundary 106-1a of the first extension 106-1 of the sustain electrode 106.

In exemplary embodiments, each of the first and second open portions 152a-1 and 152a-2 may have a shape extending in one direction. In an exemplary embodiment, as shown in the exemplary embodiment of FIG. 4, the first open portion 152a-1 and the second open portion 152a-2 may have shapes extending in the same direction of the direction (column direction) in which the data line 132 extends, for example.

In exemplary embodiments, each of the first and second open portions 152a-1 and 152a-2 may have a rectangular shape in a plan view, as shown in the exemplary embodiment of FIG. 4. However, this is only for illustrative purposes, the shapes of the first and second open portions 152a-1 and 152a-2 are not limited to this.

In exemplary embodiments, each of the first and second open portions 152a-1 and 152a-2 may have a first end and a second end with respect to the column direction. The boundary 106-1a of the first extension 106-1 of the sustain electrode 106 may traverse the first and second ends of the first open portion 152a-1. The boundary 106-1a of the first extension 106-1 of the sustain electrode 106 may traverse the first and second ends of the second open portion 152a-2. However, this is only for illustrative purposes, and the invention is not limited thereto.

In exemplary embodiments, as shown in the exemplary embodiment of FIG. 4, the open portions 152a-1 and 152a-2 may be embodied by a structure in which they are enclosed by the central portion 152-1, edge portions 152-2a and 152-2b, and the connection portions 152-3a, 152-3b, 152-3c, and 152-3d. However, this is only illustrative purposes. The structure of the open portions 152a-1 and 152-2 is not limited to this.

The connection portions 152-3a, 152-3b, 152-3c, and 152-3d connect the central portion 152-1 and the edge portions 152-2a and 152-2b to each other. The connection portions 152-3a, 152-3b, 152-3c, and 152-3d are disposed between the central portion 152-1 and the edge portions 152-2a and 152-2b.

In exemplary embodiments, as shown in the exemplary embodiment of FIG. 4, the connection portions 152-3a, 152-3b, 152-3c, and 152-3d includes a first connection portion 152-3a, a second connection portion 152-3b, a third connection portion 152-3c, and a fourth connection portion 152-3d. The first connection portion 152-3a is disposed on a first side (an upper side in the drawing) of the first end of the first open portion 152a-1. The second connection portion 152-3b is disposed on a second side (a lower side in the drawing) of the first end of the first open portion 152a-1. The third connection portion 152-3c is disposed on a first side (an upper side in the drawing) of the first end of the second open portion 152a-2. The fourth connection portion 152-3d is disposed on a second side (a lower side in the drawing) of the second end of the second open portion 152a-2.

Each of the first, second, third, and fourth connection portions 152-3a, 152-3b, 152-3c, and 152-3d may have first and second ends with respect to the row direction. The first end of each of the first and second connection portions 152-3a and 152-3b and the second end of the each of the third and fourth connection portions 152-3c, and 152-3d may be coupled to the central portion 152-1. The second end of each of the first and second connection portions 152-3a and 152-3b may be coupled to the first edge portion 152-2a. The first end of the each of the third and fourth connection portions 152-3c, and 152-3d may be coupled to the second edge portion 152-2b.

At least a part of each of the first, second, third, and fourth connection portions 152-3a, 152-3b, 152-3c, and 152-3d may overlap the sustain electrode 106. In an exemplary embodiment, as shown in the exemplary embodiment of FIG. 4, each of the first, second, third, and fourth connection portions 152-3a, 152-3b, 152-3c, and 152-3d may overlap the corresponding first extension 106-1 of the sustain electrode 106, for example.

In exemplary embodiments, each of the first, second, third, and fourth connection portions 152-3a, 152-3b, 152-3c, and 152-3d may have a rectangular shape in a plan view, as shown in the exemplary embodiment of FIG. 4. However, this is only for illustrative purposes, and the shape of each of the first, second, third, and fourth connection portions 152-3a, 152-3b, 152-3c, and 152-3d is not limited to this.

To sustain voltage applied to the pixel electrode 152, there is the need for a part of the pixel electrode 152 to overlap the sustain electrode 106. In an exemplary embodiment, in the case where the pixel electrode 152 is embodied to have a planar shape, the edge portions of the pixel electrode 152 may overlap the sustain electrode 106, for example. In this case, a portion on which the pixel electrode 152 overlaps the sustain electrode 106 may have a stepped shape. In other words, the pixel electrode 152 may not be flattened because of the structure in which the pixel electrode 152 overlaps the sustain electrode 106. The stepped structure provided on the pixel electrode 152 may cause a difference between electric fields of positive and negative poles disposed between the pixel electrode 152 and the common electrode 232. Thereby, afterimage dispersion may deteriorate.

The pixel electrode 152 of the LCD 10 according to the exemplary embodiment of the invention is configured to prevent afterimage dispersion from deteriorating. For this, the open portions 152*a*-1 and 152*a*-2 which overlap the boundaries of the sustain electrode 106 are defined in the pixel electrode 152.

Referring to FIG. 5, as the open portions 152*a*-1 and 152*a*-2 which overlap the boundaries 106-1*a* of the sustain electrode 106 are defined in the pixel electrode 152 (refer to FIG. 1), formation of the stepped structure due to overlapping the sustain electrode 106 (refer to FIG. 1) may be minimized. Thereby, the surface of the central portion 152-1 of the pixel electrode 152 may be flattened. Consequently, afterimage dispersion may be improved. Furthermore, because the pixel electrode 152 includes the edge portions 152-2*a* and 152-2*b* which overlap the sustain electrode 106, voltage applied thereto may be sustained.

A width W1 of the data line 132 with respect to the row direction may be less than a width W5 of the first extension 106-1 of the sustain electrode 106 with respect to the row direction. In an exemplary embodiment, as shown in the exemplary embodiment of FIG. 5, the data line 132 may be disposed on an inside central portion of the first extension 106-1, for example. However, this is only for illustrative purposes, and the invention is not limited thereto. In an exemplary embodiment, the width W1 of the data line 132 with respect to the row direction may be about 3.5 micrometers (μm), for example. In an exemplary embodiment, the width W5 of the first extension 106-1 with respect to the row direction may be about 19 μm, for example. However, they are not limited to these numerical values.

In exemplary embodiments, as shown in the exemplary embodiment of FIG. 5, the edge portions 152-2*a* and 152-2*b* of the pixel electrode 152 may be disposed inside the first extension 106-1 of the sustain electrode 106. That is, the edge portions 152-2*a* and 152-2*b* of the pixel electrode 152 may completely overlap the first extension 106-1. In an exemplary embodiment, a width W3 of each edge portion 152-2*a*, 152-2*b* with respect to the row direction may be about 3.5 μm, but is not limited to this numerical value.

In exemplary embodiments, the first edge portion 152-2*a* and the second edge portion 152-2*b* of the pixel electrode 152 may be symmetrically disposed based on the data line 132. That is, although distances W2 by which the first edge portion 152-2*a* and the second edge portion 152-2*b* are spaced apart from the data line 132 are substantially equal to each other, this is only for illustrative purposes, and the invention is not limited thereto. In an exemplary embodiment, the spaced distance W2 may be about 4.25 μm, but is not limited to this numerical value.

In exemplary embodiments, the first open portion 152*a*-1 and the second open portion 152*a*-2 of the pixel electrode 152 may be symmetrically disposed based on the data line 132. In an exemplary embodiment, a width W4 of each of the first and second open portions 152*a*-1 and 152*a*-2 with respect to the row direction may be about 3 μm to about 5 μm, but this is only for illustrative purposes, and the invention is not limited thereto.

In exemplary embodiments, a width W6 of the light blocking pattern 202 with respect to the row direction may be greater than the width W5 of the first extension 106-1 of the sustain electrode 106 with respect to the row direction. In an exemplary embodiment, as shown in the exemplary embodiment of FIG. 5, the first extension 106-1 of the sustain electrode 106 may be disposed over an inside central portion of the light blocking pattern 202, for example. However, this is only for illustrative purposes, and the invention is not limited thereto. In an exemplary embodiment, the width W6 of the light blocking pattern 202 with respect to the row direction may be about 23 μm, but this is only for illustrative purposes, and the invention is not limited thereto.

In exemplary embodiments, the first open portion 152*a*-1 and the second open portion 152*a*-2 of the pixel electrode 152 may be defined inside the light blocking pattern 202. However, this is only for illustrative purposes, and the invention is not limited thereto.

Figure 6:
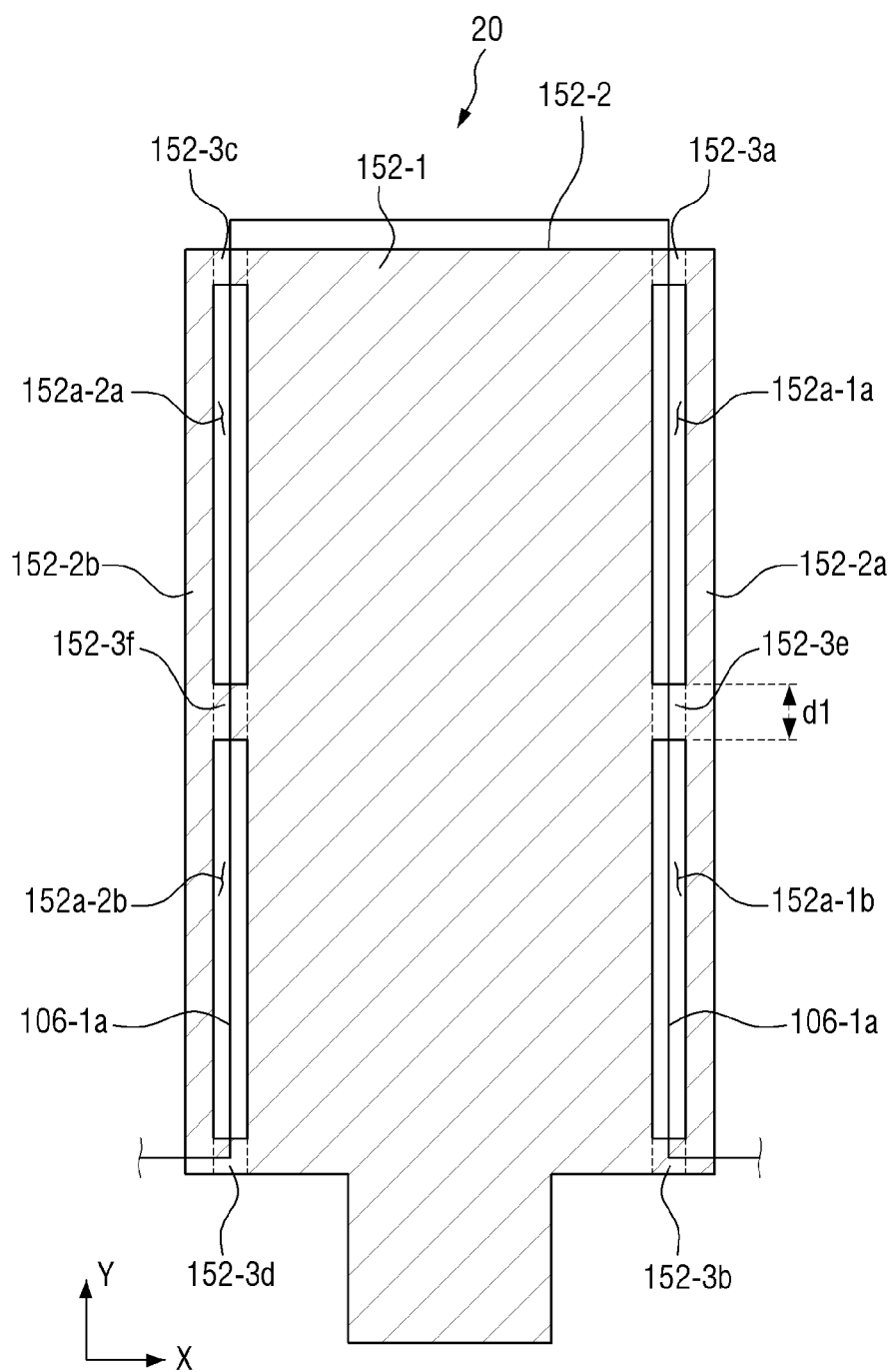
FIG. 6 is a plan view illustrating a pixel electrode of an LCD according to another exemplary embodiment of the invention.

FIG. 6 is a plan view illustrating a pixel electrode of an LCD according to another exemplary embodiment of the invention.

Referring to FIG. 6, the LCD 20 according to the exemplary embodiment may differ in configuration of open portions 152*a*-1*a*, 152*a*-1*b*, 152*a*-2*a*, and 152*a*-2*b* of the pixel electrode 152-2 from the LCD 10 described with reference to FIGS. 1 to 5, and the other configurations of the LCD 20 may be equal or similar to those of the LCD 10. In the following description, the LCD 20 will be explained below, focusing on differences from the LCD 10.

The open portions 152*a*-1*a*, 152*a*-1*b*, 152*a*-2*a*, and 152*a*-2*b* according to the exemplary embodiment include a first open portion 152*a*-1*a*, a second open portion 152*a*-1*b*, a third open portion 152*a*-2*a*, and a fourth open portion 152*a*-2*b*.

The first open portion 152*a*-1*a* and the second open portion 152*a*-1*b* may be disposed at positions spaced apart from each other by a predetermined distance d1 with respect to the column direction. The third open portion 152*a*-2*a* and the fourth open portion 152*a*-2*b* may be disposed at positions spaced apart from each other by a predetermined distance d1 with respect to the column direction. That is, unlike the LCD 10 described with reference to FIGS. 1 to 5, the open portions 152*a*-1*a*, 152*a*-1*b*, 152*a*-2*a*, and 152*a*-2*b* according to the exemplary embodiment are embodied in such a way that each of the first and second open portions 152*a*-1 and 152*a*-2 of the LCD 10 is divided in the column direction.

Connection portions 152-3*a*, 152-3*b*, 152-3*c*, 152-3*d*, 152-3*e*, and 152-3*f* according to the illustrated exemplary embodiment include a first connection portion 152-3*a*, a second connection portion 152-3*b*, a third connection portion 152-3*c*, a fourth connection portion 152-3*d*, a fifth connection portion 152-3*e*, and a sixth connection portion 152-3*f*.

The fifth connection portion 152-3*e* is disposed between the first open portion 152*a*-1*a* and the second open portion 152*a*-1*b*. In detail, the fifth connection portion 152-3*e* is disposed on a second side (a lower side in the drawing) of a second end of the first open portion 152*a*-1*a*. In other words, the fifth connection portion 152-3*e* is disposed on a first side (an upper side in the drawing) of a first end of the second open portion 152*a*-1*b*.

The sixth connection portion 152-3f is disposed between the third open portion 152a-2a and the fourth open portion 152a-2b. In detail, the sixth connection portion 152-3f is disposed on a second side (a lower side in the drawing) of a second end of the third open portion 152a-2a. In other words, the sixth connection portion 152-3f is disposed on a first side (an upper side in the drawing) of a first end of the fourth open portion 152a-2b.

Each of the fifth connection portion 152-3e and the sixth connection portion 152-3f may include a first end and a second end with respect to the row direction. The first end of the fifth connection portion 152-3e and the second end of the sixth connection portion 152-3f may be coupled to the central portion 152-1. The second end of the fifth connection portion 152-3e may be coupled to the first edge portion 152-2a. The first end of the sixth connection portion 152-3f may be coupled to the second edge portion 152-2b.

The other first, second, and third connection portions 152-3a, 152-3b, 152-3c, and 152-3d may be substantially the same as the connection portions 152-3a, 152-3b, 152-3c, and 152-3d of the LCD 10 described with reference to FIGS. 1 to 5.

Figure 7:
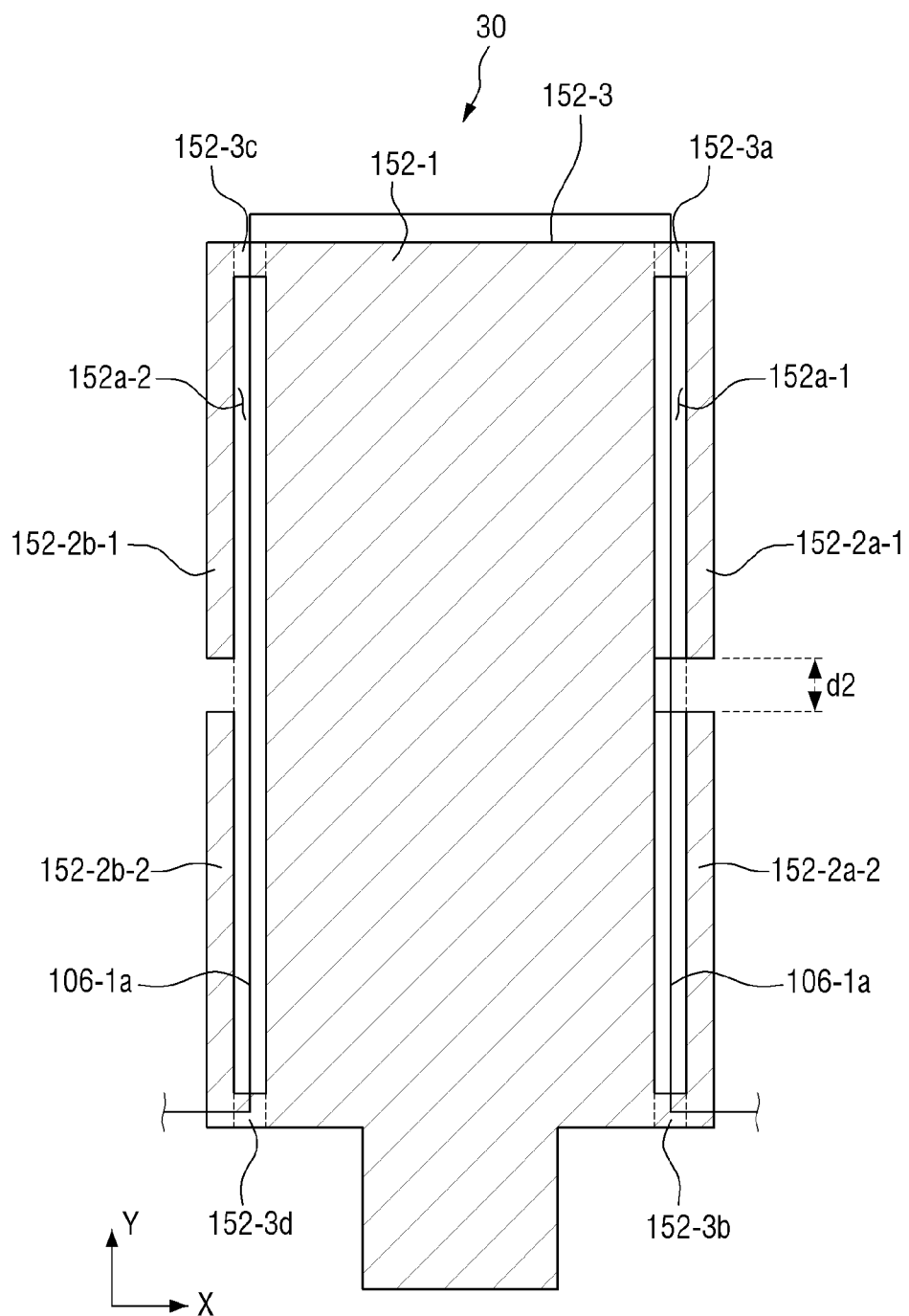
FIGS. 7 to 9 are plan views illustrating pixel electrodes of an LCD according to other embodiments of the invention.

FIG. 7 is a plan view illustrating a pixel electrode of an LCD according to a further embodiment of the invention.

Referring to FIG. 7, the LCD 30 according to the exemplary embodiment may differ in configuration of edge portions 152-2a-1, 152-2a-2, 152-2b-1, and 152-2b-2 of the pixel electrode 152-3 from the LCD 10 described with reference to FIGS. 1 to 5, and the other configurations of the LCD 30 may be equal or similar to those of the LCD 10. In the following description, the LCD 30 will be explained below, focusing on differences from the LCD 10.

The edge portions 152-2a-1, 152-2a-2, 152-2b-1, and 152-2b-2 of the exemplary embodiment include a first edge portion 152-2a-1, a second edge portion 152-2a-2, a third edge portion 152-2b-1, and a fourth edge portion 152-2b-2.

The first edge portion 152-2a-1 and the second edge portion 152-2a-2 may be disposed at positions spaced apart from each other by a predetermined distance d2 with respect to the column direction. The third edge portion 152-2b-1 and the fourth edge portion 152-2b-2 may be disposed at positions spaced apart from each other by a predetermined distance d2 with respect to the column direction. That is, unlike the LCD 10 described with reference to FIGS. 1 to 5, the edge portions 152-2a-1, 152-2a-2, 152-2b-1, and 152-2b-2 according to the exemplary embodiment are embodied in such a way that each of the first and second edge portions 152-2a and 152-2b of the LCD 10 is divided in the column direction.

As the edge portions 152-2a-1, 152-2a-2, 152-2b-1, and 152-2b-2 are embodied to have a shape in which they are divided in the column direction, the open portions 152a-1 and 152a-2 are embodied to have an open structure rather than a structure in which they are enclosed by the central portion 152-1, the edge portions 152-2a-1, 152-2a-2, 152-2b-1, and 152-2b-2, and the connection portions 152-3a, 152-3b, 152-3c, and 152-3d.

Figure 8:
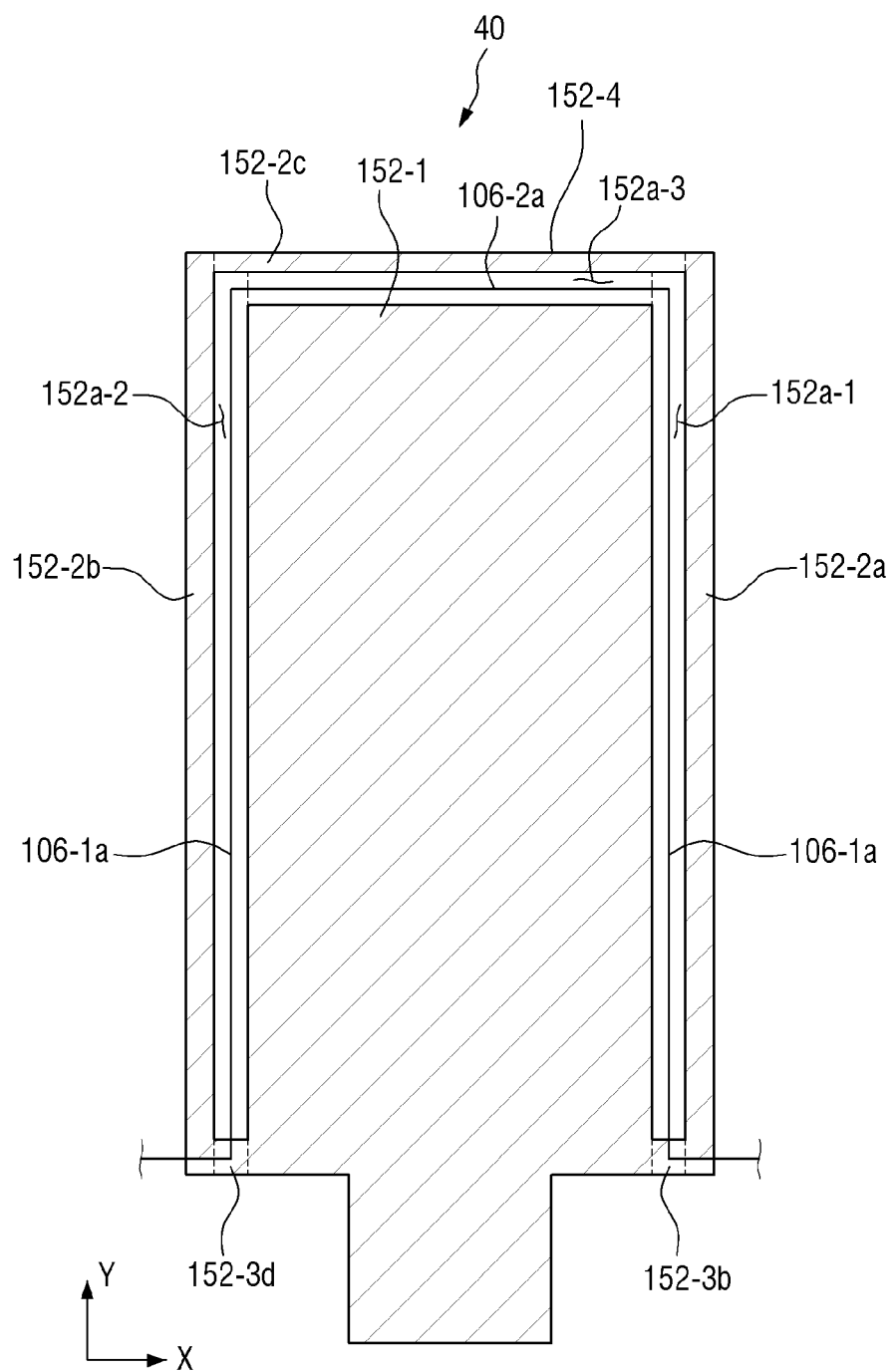

FIG. 8 is a plan view illustrating a pixel electrode of an LCD according to yet another exemplary embodiment of the invention.

Referring to FIG. 8, the LCD 40 according to the exemplary embodiment may differ in configuration of edge portions 152-2a, 152-2b, and 152-2c and open portions 152a-1, 152a-2 and 152a-3 of the pixel electrode 152-4 from the LCD 10 described with reference to FIGS. 1 to 5, and the other configurations of the LCD 40 may be equal or similar to those of the LCD 10. In the following description, the LCD 40 will be explained below, focusing on differences from the LCD 10.

The edge portions 152-2a, 152-2b, and 152-2c according to the exemplary embodiment include a first edge portion 152-2a, a second edge portion 152-2b, and a third edge portion 152-2c. The location and shape of the first edge portion 152-2a and the second edge portion 152-2b according to the exemplary embodiment may be substantially the same as those of the edge portions 152-2a and 152-2b of the LCD 10 described with reference to FIGS. 1 to 5.

The third edge portion 152-2c may be disposed on a perimeter of the pixel region, that is, at an outer side of the central portion 152-1 and the third open portion 152a-3. The third edge portion 152-2c may overlap at least a part of the sustain electrode 106. In detail, the third edge portion 152-2c may overlap the second extension 106-2 of the sustain electrode 106. In an exemplary embodiment, the third edge portion 152-2c may be disposed inside the second extension 106-2 (refer to FIG. 1). That is, the third edge portion 152-2c may completely overlap the second extension 106-2.

The third edge portion 152-2c may have a shape in which it extends in one direction. In an exemplary embodiment, as shown in the exemplary embodiment of FIG. 8, the third edge portion 152-2c may have a shape in which it extends in the same direction as the direction (the row direction) in which the gate lines 102 extend, for example.

In exemplary embodiments, the third edge portion 152-2c may have a rectangular shape in a plan view, as shown in the exemplary embodiment of FIG. 8. However, this is only for illustrative purposes, and the shape of the third edge portion 152-2c is not limited to this.

In exemplary embodiments, the third edge portion 152-2c may have a first end and a second end with respect to the row direction. The first end of the third edge portion 152-2c may be coupled to the second edge portion 152-2b. The second end of the third edge portion 152-2c may be coupled to the first edge portion 152-2a. That is, the third edge portion 152-2c may be disposed between the first edge portion 152-2a and the second edge portion 152-2b, and the first edge portion 152-2a and the second edge portion 152-2b may form a shape in which they are coupled to each other by the third edge portion 152-2c.

Therefore, the exemplary embodiment may be embodied by a structure that has only the second connection portion 152-3b and the fourth connection portion 152-3d of the LCD 10 described with reference to FIGS. 1 to 5 without having the first connection portion 152-3a and the third connection portion 152-3c of the LCD 10. However, this is only for illustrative purposes. In other embodiments, the pixel electrode may be embodied by a structure in which either the second connection portion 152-3b or the fourth connection portion 152-3d is omitted.

In the embodiment, the open portions 152a-1, 152a-2, and 152a-3 include a first open portion 152a-1, a second open portion 152a-2, and a third open portion 152a-3. The location and shape of the first open portion 152a-1 and the second open portion 152a-2 according to the exemplary embodiment may be substantially the same as those of the open portions 152a-1 and 152a-2 of the LCD 10 described with reference to FIGS. 1 to 5.

The third open portion 152a-3 is disposed at an inner side of the pixel region than is the third edge portion 152-2c. That is, the third open portion 152a-3 may be disposed between the central portion 152-1 and the third edge portion 152-2c.

The third open portion 152a-3 may only partially overlap the sustain electrode 106. The third open portion 152a-3 may include a portion which does not overlap the sustain electrode 106. In detail, the third open portion 152*a*-3 may overlap the boundary 106-2*a* of the second extension 106-2 of the sustain electrode 106.

In exemplary embodiments, the third open portion 152*a*-3 may have a shape in which it extends in one direction. In an exemplary embodiment, as shown in the exemplary embodiment of FIG. 8, the third open portion 152*a*-3 may have a shape in which it extends in the same direction as the direction (the row direction) in which the gate lines 102 extend, for example.

In exemplary embodiments, the third open portion 152*a*-3 may have a rectangular shape in a plan view, as shown in the exemplary embodiment of FIG. 8. However, this is only for illustrative purposes, and the shape of the third open portion 152*a*-3 is not limited to this.

In exemplary embodiments, the third open portion 152*a*-3 may include a first end and a second end with respect to the row direction. The boundary 106-2*a* of the second extension 106-2 of the sustain electrode 106 may traverse the first and second ends of the third open portion 152*a*-3.

The first end of the third open portion 152*a*-3 may be coupled to the second open portion 152*a*-2. The second end of the third open portion 152*a*-3 may be coupled to the first open portion 152*a*-1. That is, the third open portion 152*a*-3 may be defined between the first open portion 152*a*-1 and the second open portion 152*a*-2, and first open portion 152*a*-1 and the second open portion 152*a*-2 may form a shape in which they are coupled to each other through the third open portion 152*a*-3.

In exemplary embodiments, as shown in the exemplary embodiment of FIG. 8, the open portions 152*a*-1, 152*a*-2, and 152*a*-3 may be embodied to have a closed/integrated structure in which they are enclosed by the central portion 152-1, the edge portions 152-2*a*, 152-2*b*, and 152-2*c*, and the connection portions 152-3*b* and 152-3*d*. This is only for illustrative purposes, and the structure of the open portions 152*a*-1, 152*a*-2, and 152*a*-3 is not limited to this.

Figure 9:
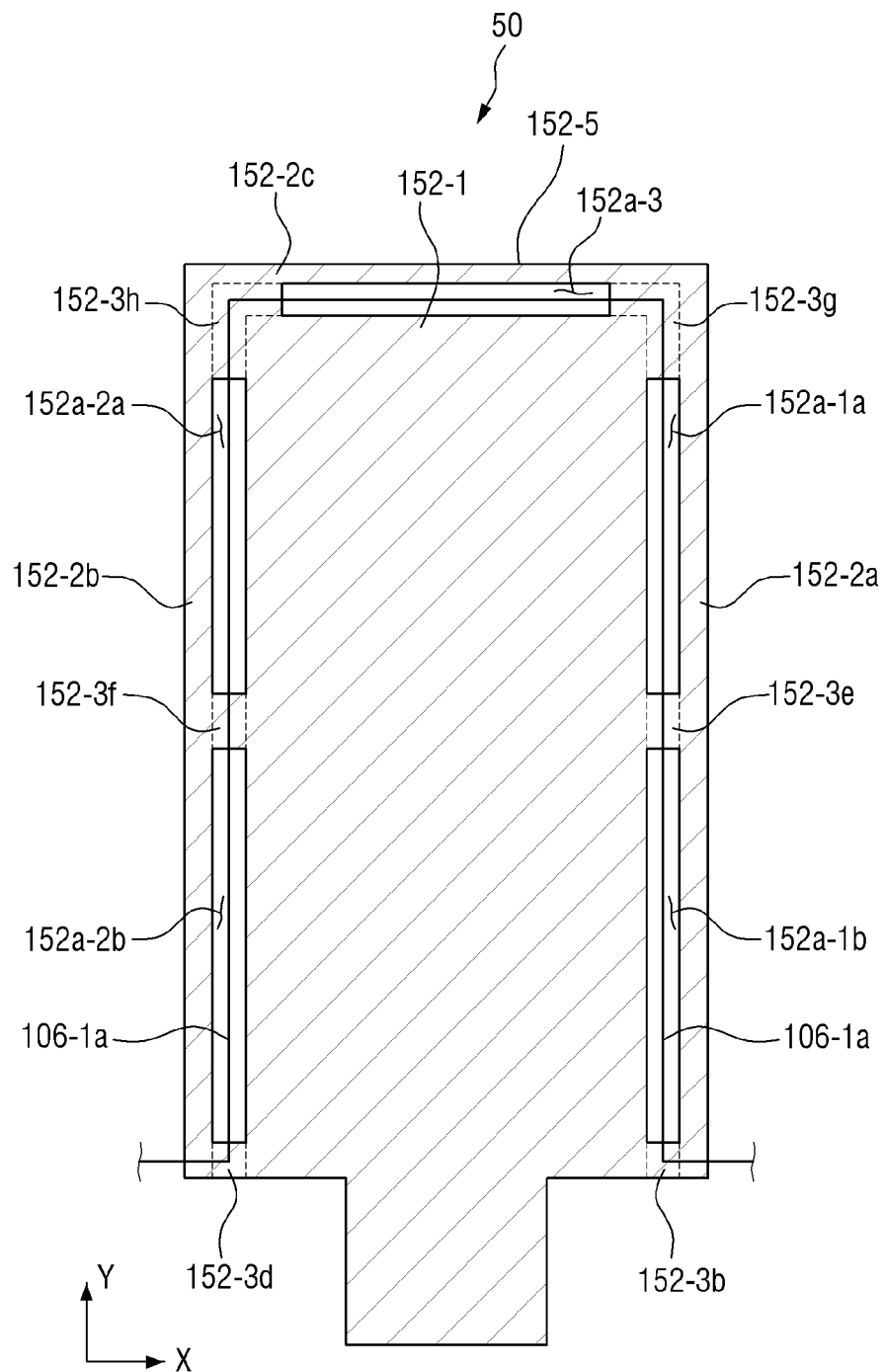

FIG. 9 is a plan view illustrating a pixel electrode of an LCD according to yet another exemplary embodiment of the invention.

Referring to FIG. 9, the LCD 50 according to the exemplary embodiment may differ in configuration of the open portions 152*a*-1*a*, 152*a*-1*b*, 152*a*-2*a*, and 152*a*-2*b* of the pixel electrode 152-5 from the LCD 20 described with reference to FIG. 6 or the LCD 40 described with reference to FIG. 8, and the other configurations of the LCD 50 may be equal or similar to those of the LCD 20 or 40. In the following description, the LCD 50 will be explained below, focusing on differences from the LCD 20 or 40.

The open portions 152*a*-1*a*, 152*a*-1*b*, 152*a*-2*a*, 152*a*-2*b*, and 152*a*-3 according to the exemplary embodiment include a first open portion 152*a*-1*a*, a second open portion 152*a*-1*b*, a third open portion 152*a*-2*a*, a fourth open portion 152*a*-2*b*, and a fifth open portion 152*a*-3. The locations and shapes of the first open portion 152*a*-1*a*, the second open portion 152*a*-1*b*, the third open portion 152*a*-2*a*, and the fourth open portion 152*a*-2*b* according to the exemplary embodiment may be substantially the same as those of the open portions 152*a*-1*a*, 152*a*-1*b*, 152*a*-2*a*, and 152*a*-2*b* of the LCD 20 described with reference to FIG. 6.

Connection portions 152-3*g*, 152-3*h*, 152-3*h*, 152-3*d*, 152-3*e*, and 152-3*f* according to the exemplary embodiment include a first connection portion 152-3*g*, a second connection portion 152-3*h*, a third connection portion 152-3*h*, a fourth connection portion 152-3*d*, a fifth connection portion 152-3*e*, and a sixth connection portion 152-3*f*. The locations and shapes of the second connection portion 152-3*b*, the fourth connection portion 152-3*d*, the fifth connection portion 152-3*e*, and the sixth connection portion 152-3*f* according to the exemplary embodiment may be substantially the same as those of the second connection portion 152-3*b*, the fourth connection portion 152-3*d*, the fifth connection portion 152-3*e*, and the sixth connection portion 152-3*f* of the connection portions 152-3*a*, 152-3*b*, 152-3*c*, 152-3*d*, 152-3*e*, and 152-3*f* of the LCD 20 described with reference to FIG. 6.

The fifth open portion 152*a*-3 according to the exemplary embodiment differs from the third open portion 152*a*-3 of the LCD 40 described with reference to FIG. 8 in that the third connection part 152-3*h* is disposed on a first side of a first end of the fifth open portion 152*a*-3 according to the exemplary embodiment and the first connection part 152-3*g* is disposed on a second side of a second end of the fifth open portion 152*a*-3. The same description as that of the third open portion 152*a*-3 of the LCD 40 described with reference to FIG. 8 may be applied for the other configuration of the fifth open portion 152*a*-3.

In exemplary embodiments, as shown in the exemplary embodiment of FIG. 9, the first connection portion 152-3*g* and the third connection portion 152-3*h* may be embodied to have a bent structure. However, this is only for illustrative purposes, and the structure of the first and third connection portions 152-3*g* and 152-3*h* is not limited to this. As described above, an LCD according to the invention has a structure capable of minimizing formation of a stepped shape due to overlapping between a pixel electrode and a sustain electrode, thus improving afterimage dispersion.

The effects of the invention are not limited by the foregoing, and other various effects are anticipated herein.

Although the preferred embodiments of the invention have been disclosed for illustrative purposes, the invention is not limited thereto, and those skilled in the art will appreciate that various modifications, additions and substitutions are possible, without departing from the scope and spirit of the invention as disclosed in the accompanying claims. For instance, each element illustrated in detail in the embodiments of the invention may be modified in a variety of forms. Furthermore, differences relating to these modifications and applications must be construed as falling within the scope of the invention defined in the appended claims.

What is claimed is:

1. A liquid crystal display comprising:
    a first substrate and a second substrate facing each other;
    a liquid crystal layer disposed between the first substrate and the second substrate;
    a gate line and a data line which are disposed on the first substrate, intersect with each other, and define a pixel region;
    a sustain electrode disposed on the first substrate and overlapping the data line; and
    a pixel electrode which is disposed in the pixel region on the first substrate, and includes an edge portion overlapping the sustain electrode, an open portion defined in an inner side of the edge portion and overlapping a boundary of the sustain electrode, and a central portion disposed at an inner side of the open portion,
    wherein the open portion is an empty portion in which a material of the pixel electrode does not exist.

2. The liquid crystal display of claim 1, wherein
    the data line and the open portion extend in a first direction.

3. The liquid crystal display of claim 2, wherein
the open portion includes a first end and a second end with respect to the first direction, and the boundary of the sustain electrode traverses the first and second ends of the open portion.

4. The liquid crystal display of claim 3, wherein
the pixel electrode further comprises a first connection portion disposed on a first side of the first end of the open portion, and a second connection portion disposed on a second side of the second end of the open portion, and
each of the first and second connection portions includes a first end and a second end with respect to a second direction perpendicular to the first direction, the first end of each of the first and second connection portions is coupled to the central portion, and the second end of each of the first and second connection portions is coupled to the edge portion.

5. The liquid crystal display of claim 4, wherein
a surface of the central portion is flat.

6. The liquid crystal display of claim 4, wherein
at least a part of the first and second connection portions overlaps the sustain electrode.

7. The liquid crystal display of claim 2, wherein
the open portion includes a first open portion and a second open portion, and the first open portion and the second open portion are spaced apart from each other in the first direction.

8. The liquid crystal display of claim 2, wherein
the edge portion includes a first edge portion and a second edge portion which extend in the first direction, and the first edge portion and the second edge portion are spaced apart from each other in the first direction.

9. The liquid crystal display of claim 2, wherein
the open portion has a rectangular shape in a plan view.

10. The liquid crystal display of claim 2, wherein
a width of the open portion with respect to a second direction perpendicular to the first direction is about 3 micrometers to about 5 micrometers.

11. The liquid crystal display of claim 2, further comprising:
a light blocking pattern disposed on the second substrate and overlapping the data line,
wherein a width of the light blocking pattern with respect to a second direction perpendicular to the first direction is greater than a width of the sustain electrode with respect to the second direction.

12. The liquid crystal display of claim 11, further comprising:
an overcoating layer disposed on the light blocking pattern; and
a common electrode disposed on the overcoating layer.

13. A liquid crystal display comprising:
a first substrate and a second substrate facing each other;
a liquid crystal layer disposed between the first substrate and the second substrate;
first and second gate lines disposed on the first substrate and spaced apart from each other in a first direction;
first and second data lines which are disposed on the first substrate, respectively intersect the first and second gate lines, and spaced apart from each other in a second direction perpendicular to the first direction;
a first sustain electrode and a second sustain electrode which are disposed on the first substrate, and respectively overlap the first data line and the second data line; and
a pixel electrode including a first edge portion overlapping the first sustain electrode, a second edge portion overlapping the second sustain electrode, a first open portion defined in an inner side of the first edge portion and overlapping a boundary of the first sustain electrode, a second open portion defined in an inner side of the second edge portion and overlapping a boundary of the second sustain electrode, and a central portion disposed at an inner side of the first open portion and the second open portion,
wherein each of the first open portion and the second open portion is an empty portion in which a material of the pixel electrode does not exist.

14. The liquid crystal display of claim 13, wherein
the first and second data lines and the first and second open portions extend in the first direction.

15. The liquid crystal display of claim 14, wherein
each of the first and second open portions includes a first end and a second end with respect to the first direction,
the boundary of the first sustain electrode traverses the first and second ends of the first open portion, and
the boundary of the second sustain electrode traverses the first and second ends of the second open portion.

16. The liquid crystal display of claim 14, wherein
the pixel electrode includes a 1st-1 connection portion disposed on a first side of a first end of the first open portion, a 2nd-1 connection portion disposed at a second side of a second end of the first open portion, a 1st-2 connection portion disposed at a first side of a first end of the second open portion, and a 2nd-2 connection portion disposed at a second side of a second end of the second open portion, and
each of the 1st-1, 2nd-1, 1st-2, and 2nd-2 connection portions includes a first end and a second end with respect to the second direction, the first end of each of the 1st-1 and 2nd-1 connection portions and the second end of each of the 1st-2 and 2nd-2 connection portions are coupled to the central portion, the second end of each of the 1st-1 and 2nd-1 connection portions is coupled to the first edge portion, and the first end of each of the 1st-2 and 2nd-2 connection portions is coupled to the second edge portion.

17. The liquid crystal display of claim 14, wherein
the first open portion includes a 1st-1 open portion and a 1st-2 open portion, and the second open portion includes a 2nd-1 open portion and a 2nd-2 open portion, and
the 1st-1 open portion and the 1st-2 open portion are spaced apart from each other in the first direction, and the 2nd-1 open portion and the 2nd-2 open portion are spaced apart from each other in the first direction.

18. The liquid crystal display of claim 14, wherein
the first edge portion comprises a 1st-1 edge portion and 1st-2 edge portion which extend in the first direction, and the second edge portion comprises a 2nd-1 edge portion and 2nd-2 edge portion which extend in the first direction, and
the 1st-1 edge portion and the 1st-2 edge portion are spaced apart from each other in the first direction, and the 2nd-1 edge portion and the 2nd-2 edge portion are spaced apart from each other in the first direction.

19. The liquid crystal display of claim 14, wherein
the first sustain electrode and the second sustain electrode extend in the first direction,
the liquid crystal display further comprises a third sustain electrode extending in the second direction perpendicular to the first direction, a first end of the third sustain electrode with respect to the second direction is coupled to the first sustain electrode, and a second end of the third sustain electrode with respect to the second direction is coupled to the second sustain electrode, and the pixel electrode further comprises a third edge portion overlapping the third sustain electrode, and a third open portion disposed at an inner side of the third edge portion and overlapping a boundary of the third sustain electrode.

20. The liquid crystal display of claim 19, wherein the third open portion extends in the second direction and includes a first end and a second end with respect to the second direction, the first end of the third open portion is coupled to the first open portion, and the second end of the third open portion is coupled to the second open portion.

* * * * *